US009469202B2

(12) United States Patent
Miglioranza (10) Patent No.: US 9,469,202 B2
(45) Date of Patent: Oct. 18, 2016

(54) METHOD FOR CONTROLLING AND SYSTEM FOR CHARGING A BATTERY POWER SUPPLY UNIT

(71) Applicant: Campagnolo S.r.l., Vicenza (IT)

(72) Inventor: Federico Miglioranza, Schio-VI (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/980,569

(22) Filed: Dec. 28, 2015

(65) Prior Publication Data

US 2016/0185234 A1 Jun. 30, 2016

Related U.S. Application Data

(63) Continuation of application No. 11/772,712, filed on Jul. 2, 2007, now abandoned.

(30) Foreign Application Priority Data

Jul. 4, 2006 (IT) .............................. MI2006A1296

(51) Int. Cl.
*H02J 7/04* (2006.01)
*B60L 11/18* (2006.01)
*H02J 7/00* (2006.01)
*H02J 7/16* (2006.01)

(52) U.S. Cl.
CPC .............. *B60L 11/18* (2013.01); *H02J 7/0072* (2013.01)

(58) Field of Classification Search
USPC ........................................................ 320/150
See application file for complete search history.

(56) References Cited

U.S. PATENT DOCUMENTS

| 2,516,048 | A | | 7/1950 | Endress |
| 5,339,018 | A | | 8/1994 | Brokaw |
| 5,599,636 | A | | 2/1997 | Braun |
| 5,710,507 | A | | 1/1998 | Rosenbluth et al. |
| 5,795,664 | A | | 8/1998 | Kelly |
| 5,834,131 | A | | 11/1998 | Lutz et al. |
| 6,002,240 | A | * | 12/1999 | McMahan ......... H01M 10/4257 320/150 |
| 6,181,103 | B1 | | 1/2001 | Chen |
| 6,188,202 | B1 | | 2/2001 | Yagi et al. |
| 6,246,600 | B1 | | 6/2001 | Thandiwe |
| 6,271,648 | B1 | | 8/2001 | Miller |
| 6,275,008 | B1 | | 8/2001 | Arai et al. |
| 6,440,602 | B1 | | 8/2002 | Morita |

(Continued)

FOREIGN PATENT DOCUMENTS

| CN | 1750317 | 3/2006 |
| DE | 2455872 | 5/1975 |

(Continued)

OTHER PUBLICATIONS

Japanese Office Action and English translation for App. No. 2007-167836—dated Feb. 28, 2012.

(Continued)

*Primary Examiner* — Yalkew Fantu
(74) *Attorney, Agent, or Firm* — Volpe and Koenig, P.C.

(57) ABSTRACT

A method of controlling and a system for charging a battery power supply unit for a bicycle electronic device, even in critical temperature conditions, is provided. Heat energy is supplied to the power supply unit when its temperature is lower than or equal to a lower temperature threshold within a closed charging temperature range characteristic of the power supply unit.

23 Claims, 9 Drawing Sheets

(56) References Cited

U.S. PATENT DOCUMENTS

| | | | |
|---|---|---|---|
| 6,451,041 B1 | 9/2002 | Moenning et al. | |
| 6,456,041 B1* | 9/2002 | Terada | B60L 11/1861 |
| | | | 320/132 |
| 6,483,272 B1 | 11/2002 | Terada et al. | |
| 6,545,449 B2 | 4/2003 | Ueda et al. | |
| 6,624,615 B1 | 9/2003 | Park | |
| 6,725,713 B2 | 4/2004 | Adamson et al. | |
| 6,861,824 B1 | 3/2005 | Liu et al. | |
| 6,917,283 B2* | 7/2005 | Takeda | B62J 99/00 |
| | | | 340/432 |
| 7,189,942 B2 | 3/2007 | Kotani et al. | |
| 2002/0070710 A1 | 6/2002 | Yagi et al. | |
| 2003/0080713 A1 | 5/2003 | Kirmuss | |
| 2003/0186111 A1 | 10/2003 | Tamakoshi | |
| 2005/0007406 A1* | 1/2005 | Haas | A41D 13/0051 |
| | | | 347/17 |
| 2005/0017690 A1 | 1/2005 | Kamenoff | |
| 2005/0156567 A1 | 7/2005 | Guderzo | |
| 2005/0274705 A1 | 12/2005 | Zhu et al. | |
| 2006/0012342 A1 | 1/2006 | Kamenoff | |
| 2006/0028182 A1 | 2/2006 | Yang et al. | |
| 2008/0042621 A1 | 2/2008 | Miglioranza | |
| 2008/0124616 A1 | 5/2008 | Miglioranza | |
| 2010/0140246 A1* | 6/2010 | Grider | B60K 6/48 |
| | | | 219/205 |

FOREIGN PATENT DOCUMENTS

| | | |
|---|---|---|
| DE | 3617439 A1 | 11/1987 |
| EP | 0645868 A2 | 3/1995 |
| EP | 0902348 A2 | 3/1999 |
| EP | 1050944 A1 | 11/2000 |
| EP | 1257033 | 11/2002 |
| EP | 1317045 A2 | 6/2003 |
| EP | 1333521 | 8/2003 |
| EP | 1557926 A1 | 7/2005 |
| JP | 07094213 | 4/1995 |
| JP | H08148189 | 6/1996 |
| JP | H10201124 | 7/1998 |
| JP | 10284133 | 10/1998 |
| JP | 11055869 | 2/1999 |
| JP | 2002125326 | 4/2002 |
| JP | 2003168491 | 6/2003 |
| JP | 2003223938 | 8/2003 |
| JP | 2004362949 | 12/2004 |
| JP | 2005057006 | 3/2005 |
| JP | 2005057007 | 3/2005 |
| JP | 2005210890 | 8/2005 |
| JP | 2006127920 | 5/2006 |
| JP | 2006196256 | 7/2006 |
| TW | 259901 | 10/1995 |
| TW | 314668 | 9/1997 |
| TW | 1233416 | 6/2005 |
| TW | I233416 | 6/2005 |
| TW | 200538317 | 12/2005 |
| TW | 1257725 | 7/2006 |
| TW | I257725 | 7/2006 |
| WO | 9323905 | 11/1993 |
| WO | 9931752 | 6/1999 |
| WO | 0022714 | 4/2000 |

OTHER PUBLICATIONS

Chinese Office Action and English translation for App. No. 200710127149.6—dated Mar. 5, 2012.

European Office Action for App. No. 07 012 165.2-1242—dated Apr. 3, 2012.

Japanese Office Action and English translation—Issued Jul. 10, 2012—Appln. No. 2007-167835.

English translation of Taiwanese Office Action for Application No. 096124365, issued Apr. 12, 2013.

Japanese Office Action and English translation—Issued Jul. 2, 2013—JP Appln. No. 2007-167835.

* cited by examiner

METHOD FOR CONTROLLING AND SYSTEM FOR CHARGING A BATTERY POWER SUPPLY UNIT

CROSS REFERENCE TO RELATED APPLICATION

This application is a continuation of U.S. patent application Ser. No. 11/772,712, filed Jul. 2, 2007 which is incorporated by reference herein as if fully set forth.

FIELD OF INVENTION

The present invention relates to a method for controlling and a system for charging a battery power supply unit, in particular for supplying power to electronic devices mounted on bicycles.

BACKGROUND

Electronic devices mounted on bicycles, for example, for controlling the electronic gearshift and/or for acquiring, displaying, and controlling riding parameters and various functions, provide for the use of a power supply unit.

The power supply unit typically consists of one or more batteries typically connected in series, also referred to as a battery pack. When the batteries used for such electronic devices are of a rechargeable type, they need to be charged by an external energy source, for example, a conventional electrical outlet or an automobile battery through a cigarette lighter socket of the automobile.

The battery charging process should take into account some characteristic parameters of the battery itself, dependant upon its type and, in particular, its chemistry. Such characteristic parameters are supplied by the battery manufacturer.

In particular, the charging of the battery at a temperature outside of a given closed characteristic temperature range—not necessarily coinciding with, and usually more limited than, the closed operating temperature range of the battery—can lead to the battery itself being damaged.

In the following present description and in the attached claims, such a closed range is indicated as closed charging temperature range.

In a known method and a system for charging a battery power supply unit for bicycle electronic devices, the power supply unit has an associated temperature sensor and in the battery charger a control logic is provided that suspends the charging of the battery if the temperature detected by the sensor is higher than a predetermined limit temperature, signalling overheating.

During the cold seasons, the battery power supply unit can reach temperature values lower than the lower limit of the aforementioned closed charging temperature range. Therefore, charging of the power supply unit on a bicycle parked outdoors or in a non-heated garage cannot take place; charging of the power supply unit removed from the bicycle and placed in a heated area also cannot occur until the temperature of the power supply unit goes above such a lower temperature limit.

The technical problem at the basis of the present invention is to make a method for controlling and a system for charging batteries that allow battery charging to also be carried out in critical temperature conditions.

SUMMARY

In a first aspect thereof, the invention concerns a method for controlling the charging of a rechargeable battery power supply unit for a bicycle electronic device, comprising the steps of detecting at least one temperature of the power supply unit, and supplying heat energy to the power supply unit when the detected temperature is lower than or equal to a lower temperature threshold within a closed charging temperature range characteristic of the power supply unit.

In a second aspect thereof, the invention concerns a power supply system for a bicycle electronic device, comprising a rechargeable battery power supply unit, at least one sensor of a temperature of the power supply unit, at least one selectively activatable heating element, that can be thermally associated with the power supply unit, and a heating controller that receives in input the output of the at least one temperature sensor and actuates the heating element when the detected temperature is lower than or equal to a lower temperature threshold within a closed charging temperature range characteristic of the power supply unit.

In another aspect thereof, the invention concerns a power supply device for a bicycle electronic device comprising a power supply unit comprising at least one rechargeable battery, a connector for a removable electrical power and data connection with a battery charger, at least one temperature sensor thermally coupled with the power supply unit, and at least one selectively activatable heating element, thermally coupled with the power supply unit, wherein the heating element is selectively actuated when the power supply device is connected to the battery charger and when the temperature detected by the sensor is lower than or equal to a lower temperature threshold within a closed charging temperature range, characteristic of the power supply unit.

In another aspect thereof, the invention concerns a battery charger for a bicycle electronic device, comprising a connector for a removable electrical power and data connection with a power supply unit of the electronic device, an electrical circuit for receiving energy from an external energy source and for selectively supplying charging energy to the power supply unit, and a heating controller that receives in input a signal indicative of a detected temperature of the power supply unit and provides a signal for the actuation of a heating element of the power supply unit when the detected temperature is lower than or equal to a lower temperature threshold within a closed charging temperature range characteristic of the power supply unit.

In another aspect thereof, the invention concerns a bicycle electronic device comprising a connector for a removable electrical power and data connection with a power supply unit, and a heating controller that receives in input a signal indicative of a detected temperature of the power supply unit and provides a signal for the actuation of a heating element of the power supply unit when the detected temperature is lower than or equal to a lower temperature threshold within a closed charging temperature range characteristic of the power supply unit.

BRIEF DESCRIPTION OF THE DRAWING(S)

The invention shall now be better described with reference to some embodiments thereof, illustrated merely as a non-limiting example in the attached drawings, wherein.

DETAILED DESCRIPTION OF THE PREFERRED EMBODIMENT(S)

Introduction

In a first aspect thereof, the invention concerns a method for controlling the charging of a rechargeable battery power supply unit for a bicycle electronic device, comprising the steps of detecting at least one temperature of the power supply unit, and supplying heat energy to the power supply unit when the detected temperature is lower than or equal to a lower temperature threshold within a closed charging temperature range characteristic of the power supply unit.

In the present description and in the attached claims, the expression "closed temperature range" means a closed temperature range comprising the extreme values.

Through heating, charging can also occur when the ambient temperature is lower than the lower limit of the characteristic closed charging temperature range.

Preferably, the steps of providing an external energy source and supplying electrical energy to the power supply unit from the external energy source are further provided.

Preferably, the step of supplying electrical energy only occurs when the detected temperature is within such a closed charging temperature range, in this way safeguarding the power supply unit from the risk of damage.

When an external energy source is provided, the method can comprise, alternatively or additionally, supplying the heat energy to the power supply unit from the external source.

Preferably, the lower temperature threshold is higher than the lower limit of the closed charging temperature range. The consequent overlapping margin between when the step of supplying electrical energy or charging step can occur, and the step of supplying heat energy or heating step ensures that the charging step is also carried out in case of inaccuracies in temperature detection. It should be noted that in this case, the heating step can be preliminary to the charging step and/or simultaneous with at least part of the charging step.

The value of the lower temperature threshold is preferably experimentally selected to provide an adequate safety margin in case of inaccuracy in detection by the temperature sensor or between two temperature sensors, the first intended for controlling the heating step and the second intended for controlling the charging step. More preferably, the lower temperature threshold is higher by a few degrees, even more preferably by about 5° C. than the lower limit of the closed charging temperature range.

In an embodiment, the step of supplying heat energy to the power supply unit is carried out until the detected temperature becomes higher than an upper temperature threshold. Through the provision of the double threshold it is possible to obtain a more continuative heating of the power supply unit, avoiding in particular a too high frequency of switching on and off the element intended for heating and the risk of instability of the system should the temperature of the power supply unit change quickly about the lower temperature threshold.

Preferably, the upper temperature threshold is lower, more preferably lower by about 25° C., than the upper limit of the closed charging temperature range.

The value of the upper temperature threshold is determined experimentally also considering the maximum power that can be supplied by the element intended for heating. Preferably, the upper temperature threshold is higher by a few degrees, more preferably by about 15° C., than the lower temperature threshold.

In an embodiment, the step of supplying heat energy comprises supplying heat power as a function of a difference between the lower temperature threshold and the detected temperature, in this way implementing a closed loop feedback control.

The function is preferably a function of the proportional, integrative, and/or derivative type.

Preferably, the step of supplying heat energy is carried out by voltage- or current-supplying a heating element of the resistive type, thermally coupled with the battery power supply unit.

In an embodiment, the step of detecting at least one temperature of the power supply unit comprises detecting a first temperature for controlling the execution of the step of supplying electrical energy and a second temperature for controlling the execution of the step of supplying heat energy. The use of two sensors is advantageous when the step of supplying electrical energy and the step of supplying heat energy are controlled by two physically distinct control units and each can autonomously manage its own sensor.

In an embodiment, at least one of the steps of detecting a temperature, supplying heat energy and supplying electrical energy is carried out independently for each of a plurality of batteries of the battery power supply unit. In this way, it is possible to individually control the charging process and the final charging level in each battery, reducing the risk of damage of the power supply unit and extending its useful life.

In an embodiment, the step of supplying energy provides a first temporal charging step at constant current and a second temporal charging step at constant voltage, in accordance with the teachings of the aforementioned known method.

In a second aspect thereof, the invention concerns a power supply system for a bicycle electronic device, comprising a rechargeable battery power supply unit, at least one sensor of a temperature of the power supply unit, at least one selectively activatable heating element, that can be thermally associated with the power supply unit, and a heating controller that receives in input the output of the at least one temperature sensor and actuates the heating element when the detected temperature is lower than or equal to a lower temperature threshold within a closed charging temperature range characteristic of the power supply unit.

Preferably, the system further comprises an electrical circuit for receiving energy from an external energy source and for selectively supplying electrical charging energy to the power supply unit.

For the reasons outlined above, preferably the lower temperature threshold is higher, more preferably by about 5° C., than the lower limit of the closed charging temperature range.

In an embodiment, the at least one heating element is deactivatable when the detected temperature is higher than an upper temperature threshold.

Preferably, the upper temperature threshold is lower than the upper limit of the closed charging temperature range, and more preferably is about 15° C.

In an embodiment, the power supply unit comprises at least two batteries and at least one heating element is thermally associated with each battery.

Alternatively or additionally, the power supply unit comprises at least two batteries and at least one temperature sensor is thermally associated with each battery.

For example, a temperature sensor and/or a heating element can be arranged between two adjacent batteries of the power supply unit. The detected temperature can thus be the average temperature or the minimum temperature of those of the various batteries making up the power supply unit, or the various embodiments of the method of the invention described above can be implemented with respect to the individual temperatures should a plurality of heating elements also be provided.

Preferably, the system comprises a power regulator connected between a power supply line of the system and the heating element, driven by the heating controller to selectively actuate the at least one heating element. The power regulator can also simply be an ON/OFF switch. More preferably, the power regulator is selected from the group consisting of relays and solid-state devices, preferably MOSFET (metal-oxide-semiconductor field-effect transistor) and transistors.

In an embodiment, the heating controller actuates the at least one heating element to supply heat power as a function of a difference between the lower temperature threshold and a temperature proportional to the detected temperature, thus implementing a closed loop feedback control. The function is preferably of the proportional, integrative, and/or derivative type.

More specifically, the heating controller can comprise a multiplier of the output signal of the at least one temperature sensor, a subtractor for subtracting the output of the multiplier from the lower temperature threshold and for obtaining an error signal, and a P.I.D. (proportional-integral-derivative) type regulator block—in other words having a transfer function of the proportional, derivative, and/or integrative type—acting upon the error signal to output a driving signal for the power regulator, the driving of the power regulator regulating a voltage at the ends of the heating element or a current through the heating element.

In an embodiment, the at least one heating element is of the resistive type and the P.I.D. regulator block causes a voltage value at the ends of the heating element or a current value flowing through it that increases as the error signal increases.

In an embodiment, the at least one heating element is of the resistive type and the P.I.D. regulator block causes a modulated voltage at the ends of the heating element, or a modulated current through the heating element, the duty cycle of which increases as the error signal increases.

Preferably, the heating element is of the resistive type, more preferably the heating element comprises at least one resistive sheet applied to at least one battery of the power supply unit, and even more preferably the at least one resistive sheet is interposed between two adjacent batteries of the power supply unit.

Preferably, the at least one temperature sensor comprises a thermistor, more preferably a negative temperature coefficient (NTC) thermistor.

Preferably, the system further comprises a charge controller that receives in input an output of the at least one temperature sensor and controls the electrical circuit to actuate the supply of electrical charging energy only when the detected temperature is within the closed charging temperature range.

In an embodiment, the at least one temperature sensor comprises at least one first temperature sensor connected to the charge controller, and at least one second temperature sensor connected to the heating controller.

Preferably, the electrical circuit comprises at least one charge circuit of the linear or switching type.

The charge circuit can be controlled by the charge controller to carry out a first temporal charging step at constant current and a second temporal charging step at constant voltage.

The charge controller and the heating controller can be embodied in a common microprocessor.

Preferably, the system further comprises a power supply and regulator circuit that can be connected to the external energy source to provide a regulated power supply to the system.

Preferably, the system further comprises at least one user interface device. In this way it is possible to set suitable values for the closed characteristic temperature range and/or for the lower temperature threshold and/or for the upper temperature threshold.

The system can further comprise at least one electronic device for controlling an electronic gearshift and/or for acquiring, displaying, and controlling bicycle riding parameters and other functions.

The components of the system can be housed in a single casing, which can be fixed to the bicycle frame.

In other embodiments, the electrical charging circuit is housed in a first casing and the power supply unit is housed in a second casing, the first and the second casing being mechanically and electrically removably connectable. In this way it is possible to reduce the weight of the bicycle by detaching the first casing or battery charger from the second casing, comprising the power supply unit or battery pack and possibly the electronic device, during use of the bicycle.

Preferably, the charge controller is housed in the first casing. By providing that the controller is part of the battery charger, the power supply device is lighter and more cost-effective, an advantageous aspect when two or more interchangeable removable power supply devices are provided.

For similar reasons, preferably the interface device(s) is (are) housed in the first casing.

Preferably, the at least one temperature sensor is housed in the second casing. Alternatively, the at least one temperature sensor can be housed in the first casing and come into thermal contact with the power supply unit when the first casing and the second casing are connected, namely during charging.

Preferably, the at least one heating element is housed in the second casing. Alternatively, the at least one heating element can be housed in the first casing and come into thermal contact with the power supply unit when the first casing and the second casing are connected, namely during charging.

The at least one electronic device can be housed in the second casing. Alternatively, the at least one electronic device can be housed in a third casing, the second casing being mechanically and electrically connectable to the third casing. In this way, the power supply unit or battery pack can be removed from the bicycle during charging, possibly being replaced by a twin battery pack to allow the prolonged operation of the electronic device.

The heating controller can be housed in the first casing, in the second casing, or in the third casing.

The power regulator can be housed in the first casing, in the second casing, or in the third casing.

When the heating controller and the electronic device are housed in the same casing, the heating controller can comprise an electronic circuit mounted on a printed circuit of the electronic device, or it can be embodied in a microprocessor of the electronic device.

In another aspect thereof, the invention concerns a power supply device for a bicycle electronic device comprising a power supply unit comprising at least one rechargeable battery, a connector for a removable electrical power and data connection with a battery charger, at least one temperature sensor thermally coupled with the power supply unit, and at least one selectively activatable heating element, thermally coupled with the power supply unit, wherein the heating element is selectively actuated when the power supply device is connected to the battery charger and when the temperature detected by the sensor is lower than or equal to a lower temperature threshold within a closed charging temperature range, characteristic of the power supply unit.

The power supply device can further comprise a power regulator for the selective actuation of the heating element, the power regulator being controlled by the battery charger.

Alternatively, the power supply device can further comprise a connector for a removable electrical power and data connection with an electronic device for controlling an electronic gearshift and/or for acquiring, displaying, and controlling bicycle riding parameters and other functions, and a power regulator for the selective actuation of the heating element, the power regulator being controlled by the electronic device.

In another aspect thereof, the invention concerns a battery charger for a bicycle electronic device, comprising a connector for a removable electrical power and data connection with a power supply unit of the electronic device, an electrical circuit for receiving energy from an external energy source and for selectively supplying charging energy to the power supply unit, and a heating controller that receives in input a signal indicative of a detected temperature of the power supply unit and provides a signal for the actuation of a heating element of the power supply unit when the detected temperature is lower than or equal to a lower temperature threshold within a closed charging temperature range characteristic of the power supply unit.

In another aspect thereof, the invention concerns a bicycle electronic device comprising a connector for a removable electrical power and data connection with a power supply unit, and a heating controller that receives in input a signal indicative of a detected temperature of the power supply unit and provides a signal for the actuation of a heating element of the power supply unit when the detected temperature is lower than or equal to a lower temperature threshold within a closed charging temperature range characteristic of the power supply unit.

DETAILED DESCRIPTION

Figure 1:
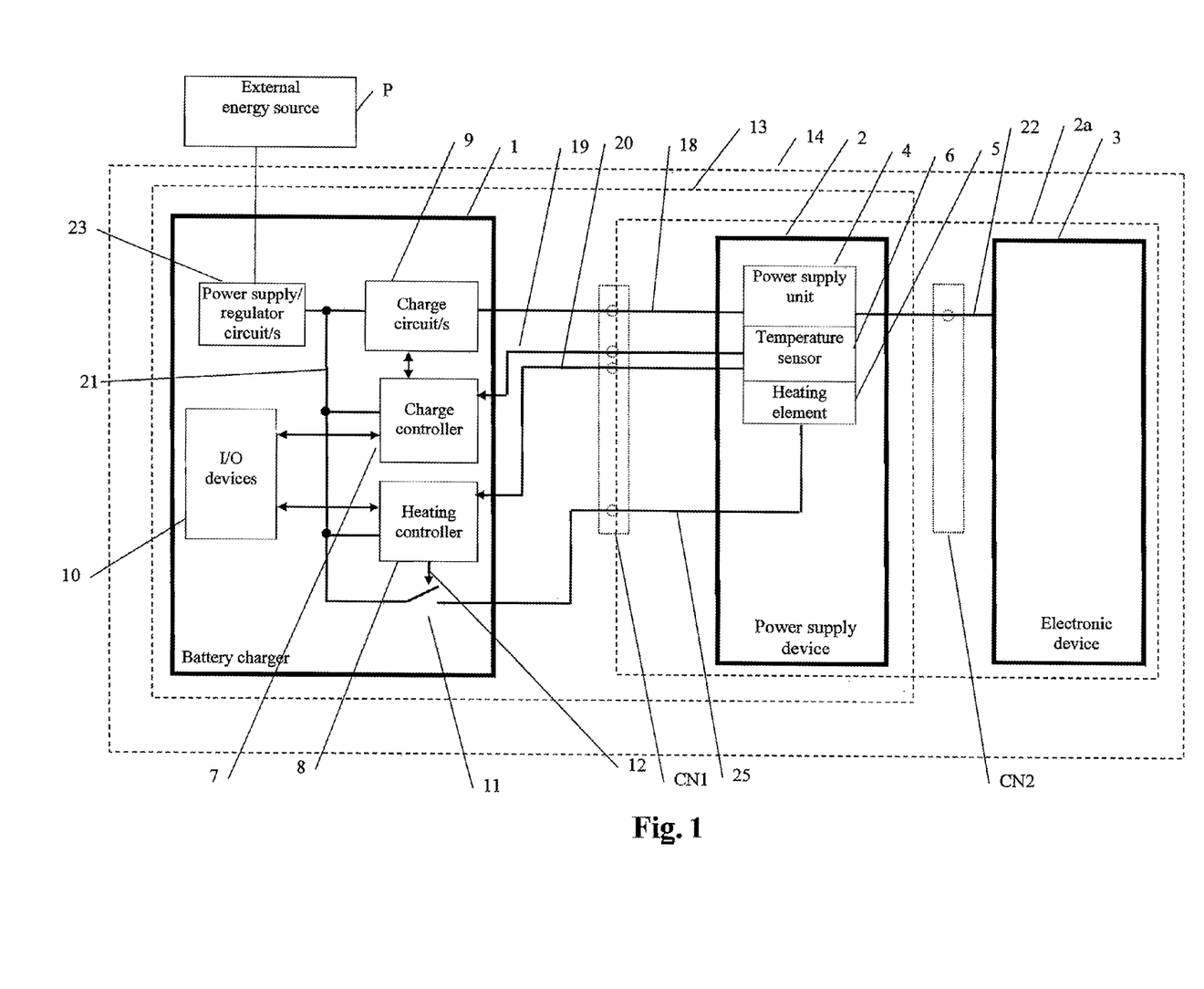
FIG. 1 is a block diagram of a first embodiment of the system of the invention, connected to an external energy source.

The block diagram of a first embodiment of the system of the invention is shown in FIG. 1. In this embodiment three functional blocks are identified, namely a battery charger 1, a rechargeable power supply device 2, and a bicycle electronic device 3, which in the most general embodiment of the system of the invention is a device external to the system itself.

The bicycle electronic device 3 and the rechargeable power supply device 2 can indeed be housed in separate casings, indicated hereafter with the same reference numerals 2 and 3, mechanically and electrically removably connectable to each other. Alternatively, the bicycle electronic device 3 and the power supply device 2 can be housed inside a same casing 2a.

The battery charger 1 and the power supply device 2 can be housed in separate casings as well, indicated hereafter with the same reference numerals 1 and 2, mechanically and electrically removably connectable to each other. Alternatively, the battery charger 1 and the power supply device 2 can be housed inside a same casing 13.

Still alternatively, the battery charger 1, the power supply device 2 and the bicycle electronic device 3 can be housed inside a same casing 14.

The battery charger 1 is power supplied, in a per se known way, through connection to an external energy source P as, for example, a conventional electrical outlet at 220V or 110V, or a cigarette lighter of an automobile. The battery charger 1 supplies power to the power supply device 2 through a line 18 and the power supply device 2 supplies power to the bicycle electronic device 3 through a line 22. It should also be understood that in addition to the connections shown there is also a ground connection, not shown for the sake of simplicity.

In FIG. 1, the electrical power connections 18, 22 and the other electrical power and data connections to be described between the battery charger 1, the power supply device 2, and the bicycle electronic device 3 are illustrated as removable, made through two pairs of multipolar connectors CN1, CN2. It is understood that one or both pairs of connectors CN1, CN2 will be missing in case only one or two casings are provided.

The rechargeable power supply device 2 comprises a power supply unit 4, a heating element 5, and a temperature sensor 6. In the practical embodiment, the power supply unit 4 could consist of many battery elements, for example, connected in series, to obtain an adequate voltage for the power supply of the bicycle electronic device 3. The power supply unit 4 is of the rechargeable type, for example, of the lithium-ion type with polymeric electrolyte.

The heating element 5 preferably consists of a resistive sheet placed in contact with the outer surface of the power supply unit 4. The temperature sensor 6 is arranged near to the power supply unit 4, also preferably in contact with the outer surface of the power supply unit 4, and it preferably consists of a passive element like an NTC (Negative Temperature Coefficient) thermistor. In different embodiments such a sensor could be of a different type, for example, a PTC (Positive Temperature Coefficient) thermistor, an active (analogue or digital) sensor, etc.

Alternatively, the heating element 5 and/or the temperature sensor 6 can be part of the battery charger 1 and come into thermal contact with the power supply unit 4 when connected to the battery charger 1, namely during charging.

The battery charger 1 comprises a first, charging control, logic unit or charge controller 7, of the known type, and a second, heating control, logic unit or heating controller 8. The first and the second logic units 7 and 8 are advantageously inside the same microprocessor unit.

The first, charging control, logic unit 7 comprises an input 19 connected to the temperature sensor 6 of the power supply device 2, and is connected to a charge circuit 9, for example of the linear or switching type, of the battery charger 1. If the power supply unit 4 consists of many battery elements, it can be provided to use as many charge circuits 9 suitably connectable to the battery elements, for example as described in EP 1 557 926 A1, which is incorporated herein by reference.

The second, heating control, logic unit 8 comprises an input connected through a data line 20 to the temperature sensor 6 of the power supply device 2, and a driving output 12 for a regulator 11 of the power of the heating element 5. The power regulator 11 can also be a simple ON/OFF switch.

The power regulator 11 preferably consists of a MOSFET, but in different embodiments such a power regulator could, for example, consist of a transistor or a relay.

In other embodiments, moreover, it can be provided to use two dedicated temperature sensors, one for the first, charging control, logic unit 7 and one for the second, heating control, logic unit 8.

The first and the second logic units 7 and 8 and the charge circuit 9 are power supplied by the external energy source P through the power supply line 21 through the interposition of power supply/regulator circuits 23 of a know type.

The power regulator 11 is connected on one side to the power supply line 21 and on the other side to the heating element 5 through the line 25.

The battery charger 1 can advantageously be provided with one or more interface devices 10, for example, an input keyboard or keypad and a display.

The operation of the system of FIG. 1 shall be described hereafter with reference to FIGS. 5-8.

Figure 2:
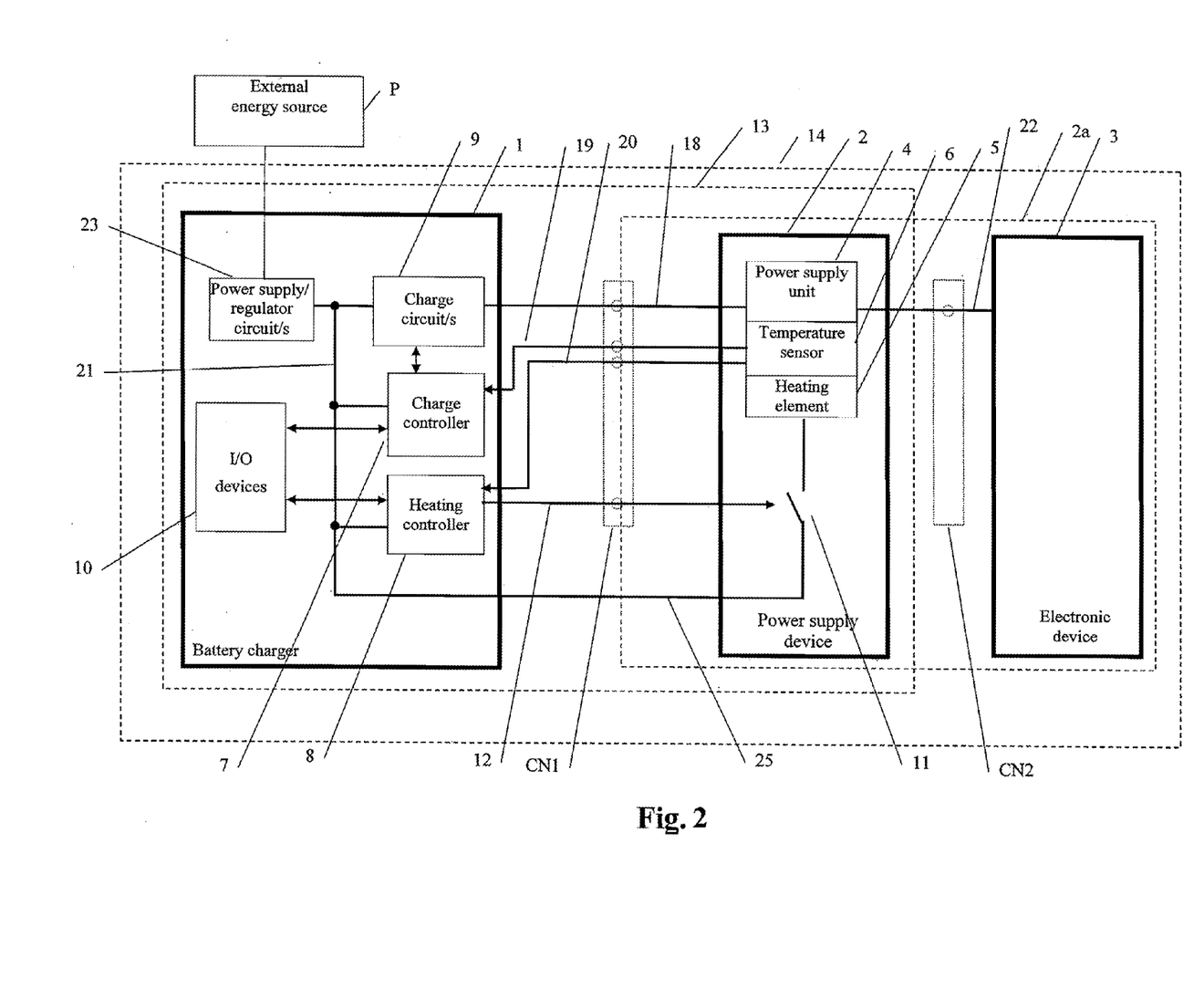
FIG. 2 is a block diagram of a second embodiment of the system of the invention, connected to an external energy source.

A second embodiment of the system according to the invention is illustrated in FIG. 2. The embodiment of FIG. 2 differs from the embodiment of FIG. 1 in that the power regulator 11 is associated with the heating element 5 inside the power supply device 2. In this case, therefore, the control output 12 of the power regulator 11 comes out from the battery charger 1 and reaches the power supply device 2, through the pair of multipolar connectors CN1 when provided for.

Such an embodiment can be particularly advantageous when the power regulator 11 is of the solid state type, for example of the MOSFET type, since during its actuation and deactuation, it undergoes heating caused by switching losses. The heat energy produced by such losses is advantageously exploited to heat the battery 4 (in addition to the heating produced by the heating element 6, as further described hereafter).

Figure 3:
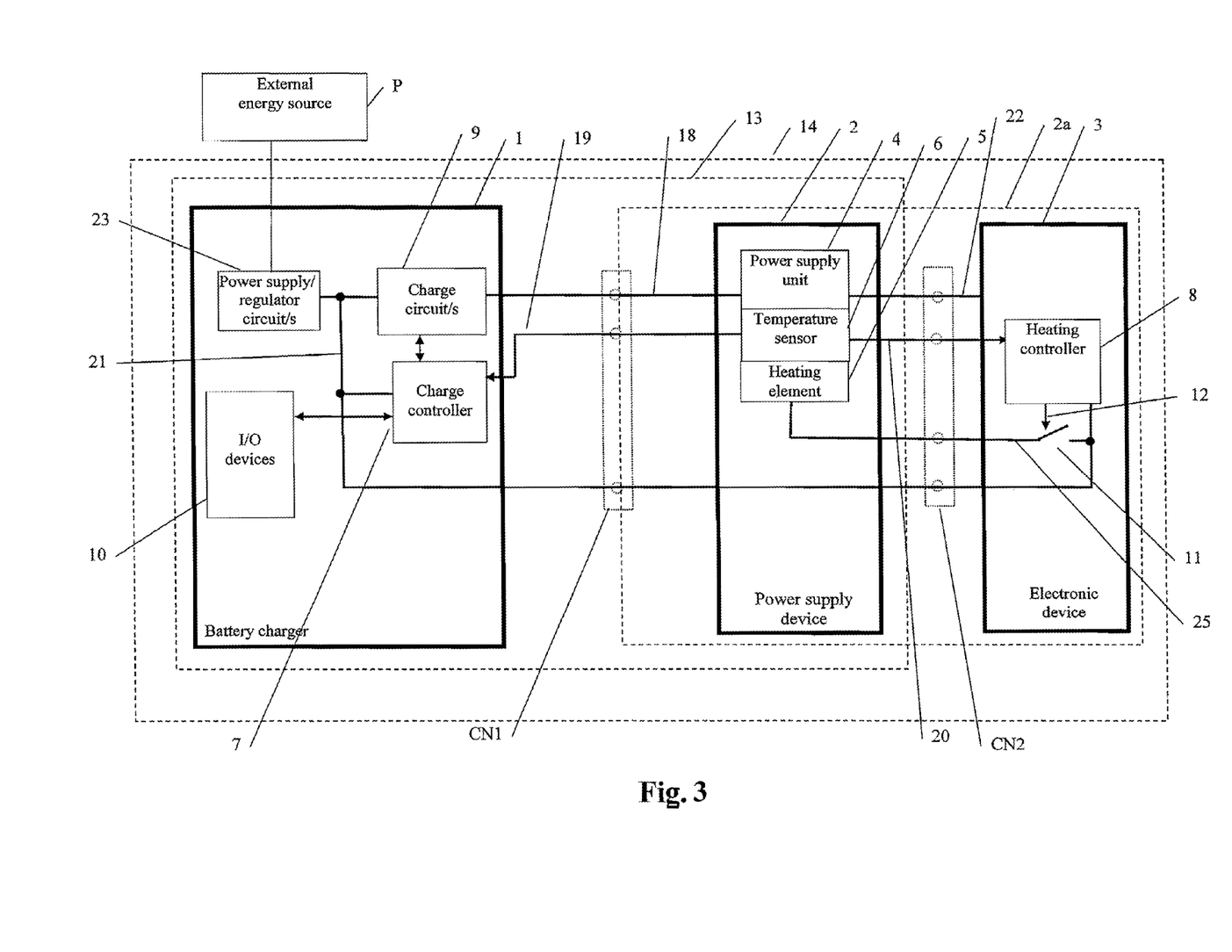
FIG. 3 is a block diagram of a third embodiment of the system of the invention, connected to an external energy source.

A third embodiment of the system according to the invention is illustrated in FIG. 3. The embodiment of FIG. 3 differs from the embodiment of FIG. 1 in that the second heating control unit 8 and the power regulator 11 are housed in the casing of the electronic device 3. In this case the power supply line 21 comes out from the battery charger 1 towards the electronic device 3, through the pairs of multipolar connectors CN1 and CN2 when provided for, to power supply the second, heating control, logic unit 8. The power supply line 25 of the heater 5 and the data line 20 between the temperature sensor 6 and the temperature controller 8 cross the pair of multipolar connectors CN2, when provided for.

In such an embodiment, moreover, the second heating control unit 8 can consist of an electronic circuit mounted on the same printed circuit where the electronic circuits of the electronic device 3 are arranged.

Alternatively, the heating control unit 8 can belong to a microprocessor of the electronic device 3, intended for other bicycle control functions, for example, the management of an automatic or semiautomatic gearshift.

Figure 4:
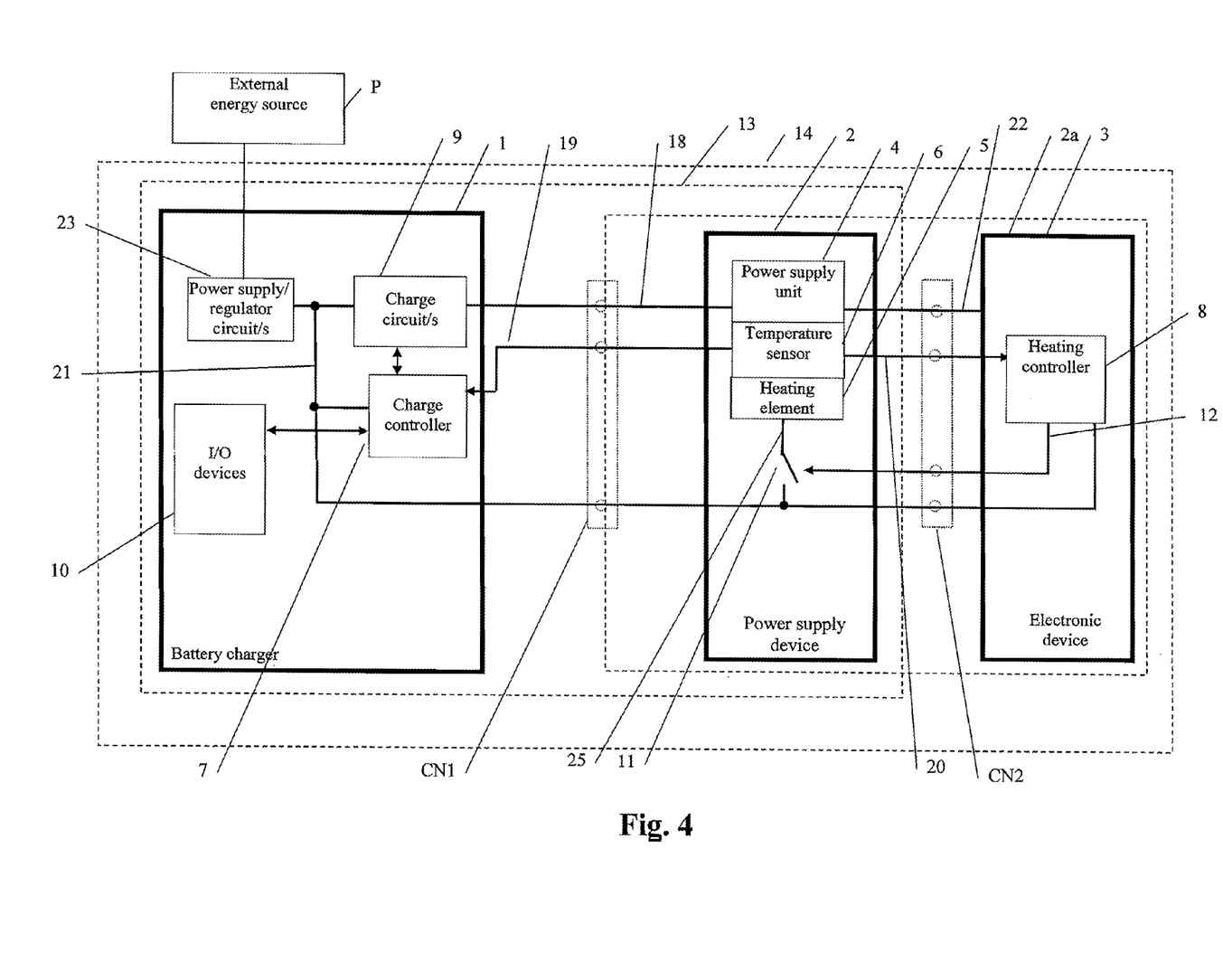
FIG. 4 is a block diagram of a fourth embodiment of the system of the invention, connected to an external energy source.

A fourth embodiment of the system according to the invention is illustrated in FIG. 4. The embodiment of FIG. 4 differs from the embodiment of FIG. 3 in that the power regulator 11 is associated with the heating element 5 inside the casing of the power supply device 2. The control line 12 of the regulator 11 comes out from the electronic device 3 towards the power supply device 2 through the pair of multipolar connectors CN2, when provided for.

Figure 5:
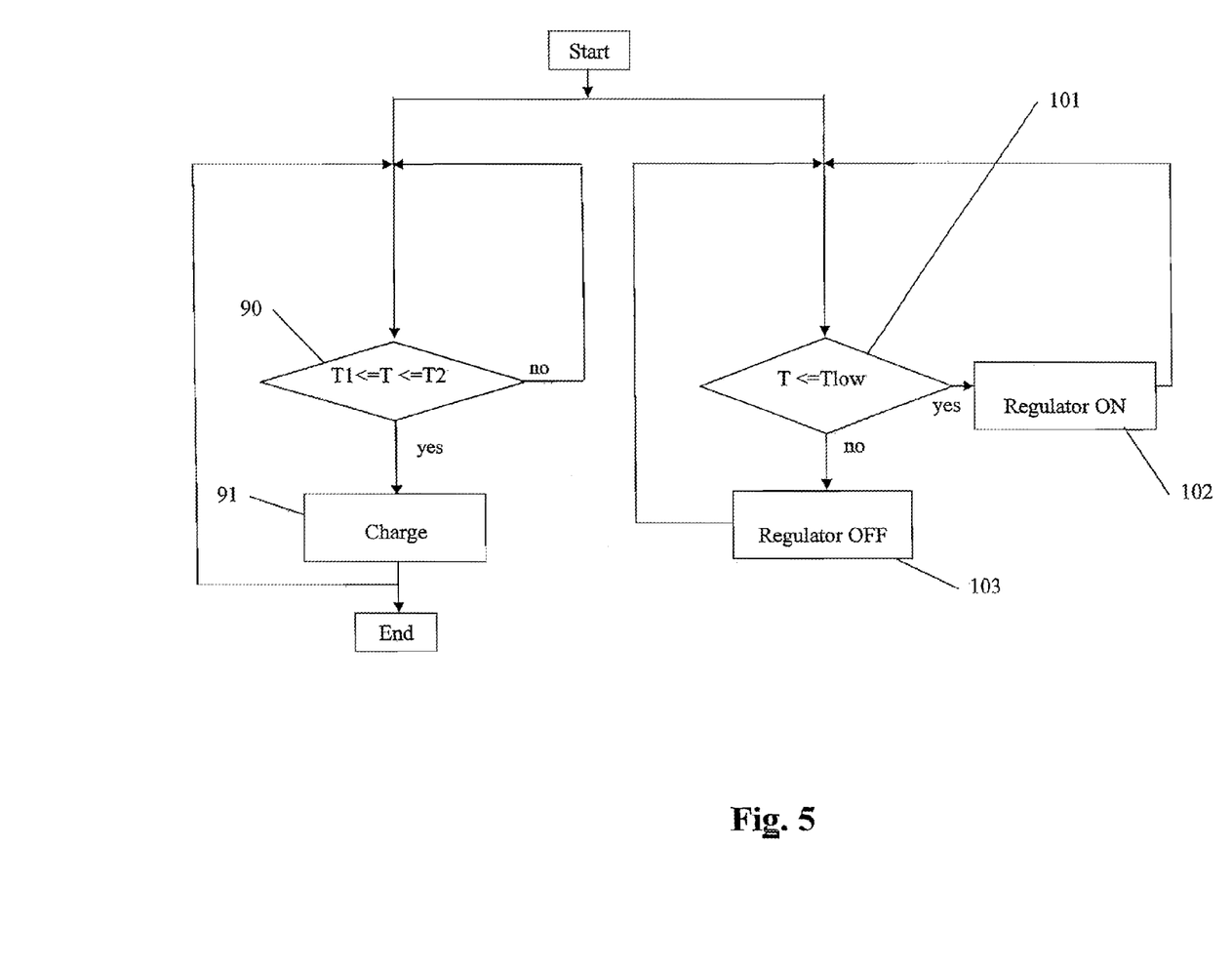
FIG. 5 is a block diagram of a first embodiment of the method of the invention.

A first embodiment of the method according to the invention shall be described with reference to FIG. 5 and to the system of one of the embodiments described above.

According to such a first embodiment of the method according to the invention different parameters are used, possibly settable by the user through the interface devices 10 or through an interface device of the electronic device 3 or computer cycle.

Such parameters comprise:

T1=lower limit charging temperature, typically a value set based upon the value provided by the manufacturer for the type of battery power supply unit 4 used; for example T1=0° C. for lithium-ion batteries with polymeric electrolyte;

T2=upper limit charging temperature, typically a value set based upon the value provided by the manufacturer for the type of battery power supply unit 4 used; for example T2=40° C. for lithium-ion batteries with polymeric electrolyte;

Tlow=lower temperature threshold, a value selected upon experimental basis and based upon the type of battery power supply unit 4 used; this lower temperature threshold is the temperature at which or above which one wishes to take or keep the temperature of the power supply unit 4, and preferably it is selected a few degrees higher than the value of the lower limit charging temperature T1; for example Tlow=5° C. for lithium-ion batteries with polymeric electrolyte.

The parameter Tlow can be omitted when the value of the lower limit charging temperature T1 is used instead.

The range of temperatures between T1 and T2 is indicated, in the present description and in the attached claims, as closed charging temperature range.

The values of T1 and T2 are stored in the first, charging control, logic unit 7, whereas the value of Tlow is stored in the second, heating control, logic unit 8.

When the charging of the power supply unit 4 needs to be carried out, the battery charger 1 is connected to the external energy source P and, if necessary, to the power supply device 2 through the pair of connectors CN1.

The first, charging control, logic unit 7 detects in block 90 the temperature value T of the power supply unit 4 through the sensor 6. If the detected value T falls within the closed charging temperature range, i.e., $T1 \leq T \leq T2$, the first, charging control, logic unit 7, in block 91, enables the charge circuit 9 to carry out the charging of the power supply unit 4. If the detected value T falls outside the closed charging temperature range, i.e., T<T1 or T>T2, the first, charging control, logic unit 7 remains in inactive state and does not enable the charge circuit 9 or else disables the charge circuit 9 in case it had previously been enabled. The way of charging by the charge circuit 9 can be of any type, for example, as described in the aforementioned document EP 1 557 926 A1, wherein charging provides for a first charging step at constant current and a second charging step at constant voltage.

Concurrently with the described operation of the first, charging control, logic unit 7, the second, heating control, logic unit 8 operates to carry out the "thermoregulation" of the power supply unit 4 independently of the operation of the first, charging control, logic unit 7.

In block 101, the heating control logic unit 8 detects the temperature value T of the power supply unit 4 through the temperature sensor 6. If the detected value T is lower than or equal to the lower limit temperature value Tlow, i.e., T<=Tlow, the heating control logic unit 8 in block 102, through the control output 12, actuates the heating element 5 driving the power regulator 11, of the ON/OFF switch type, to the closed position. If, on the other hand, the detected value T is higher than the lower limit temperature value Tlow, i.e., T>Tlow, one proceeds to block 103 where the heating control logic unit 8, again through the control output 12, deactuates the heating element 5 driving the power regulator or ON/OFF switch 11 to the open position.

The regulation cycle thus implemented is therefore a temperature control performed on a threshold Tlow.

The values of T1, T2, and Tlow are suitably selected to allow the correct operation of the apparatus. In particular, correct operation requires that T1<=Tlow. In the case of use of a lithium-ion battery with polymeric electrolyte, the value of Tlow is advantageously selected a few degrees higher than the lower limit charging temperature T1, for example Tlow=5° C. In this way, the lower temperature threshold Tlow on which the temperature control is carried out is at a safety value that ensures the charging step by the first, charging control, logic unit 7 taking possible inaccuracies in temperature detection by the sensor 6 into account, or of different readings, for whatever reason, by the two logic units 7 and 8 in the case of using two dedicated temperature sensors.

If, in the initial charging step, the temperature T of the power supply unit 4 is lower than the lower limit temperature T1, the heating 102 consists of a preliminary operation with respect to the charging operation, which shall begin when the temperature of the power supply unit 4 reaches the value T1.

On the other hand, if, in the initial charging step, the temperature T of the power supply unit 4 is comprised between T1 and Tlow, in the case wherein T1<=Tlow—for example T=3° C. in the case described above with T1=0° C. and Tlow=5° C.—the heating and charging steps shall begin simultaneously.

Figure 6:
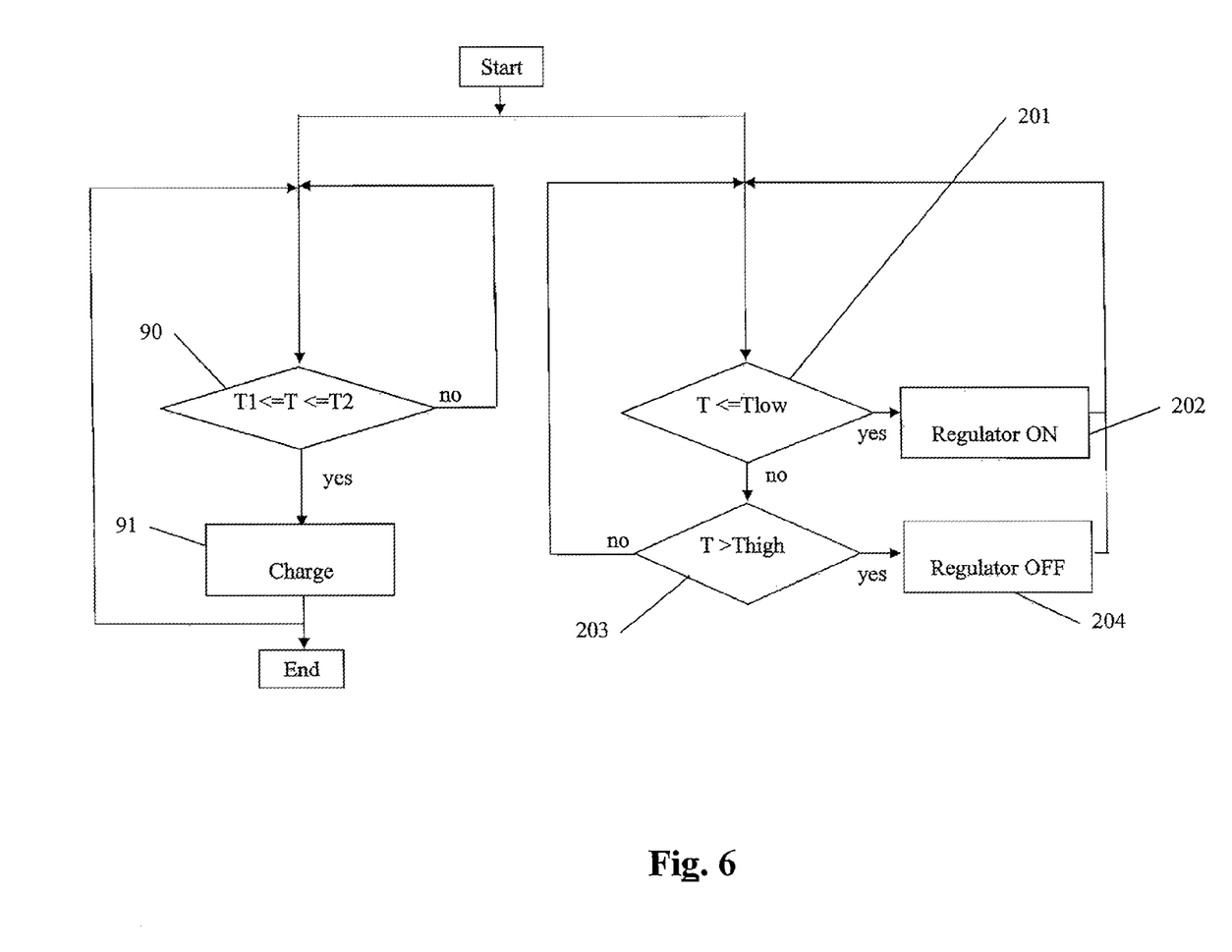
FIG. 6 is a block diagram of a second embodiment of the method of the invention.

In a second embodiment of the method according to the invention, in addition to the parameters T1, T2, and Tlow mentioned above a fourth parameter is used:

Thigh=upper temperature threshold, a value selected on an experimental basis and based upon the type of battery power supply unit 4 used, as well as the power of the heater 5; this upper temperature threshold is the temperature at which or above which one wishes to interrupt the heating of the power supply unit 4; preferably, the upper temperature threshold is selected higher by a few degrees, more preferably by about 15° C., than the lower temperature threshold and lower, more preferably lower by about 25° C., than the upper limit of the closed charging temperature range; for example Thigh=15° C. for lithium-ion batteries with polymeric electrolyte.

The value of Thigh is stored in the second, heating control, logic unit 8.

With reference to FIG. 6, concurrently with the charging blocks 90, 91 described above, in block 201 the heating control logic unit 8 detects the temperature value T of the power supply unit 4 through the temperature sensor 6. If the detected value T is lower than or equal to the lower limit temperature value Tlow, i.e., T<=Tlow, in a block 202 the heating control logic unit 8, through the driving output 12, actuates the heating element 5 closing the power regulator 11, again of the ON/OFF switch type. If, on the other hand, the detected value T is higher than the lower limit temperature value Tlow, i.e., T>Tlow, one proceeds to block 203 where the detected temperature value T is compared with the upper temperature threshold Thigh. If the detected value T is higher than the upper temperature threshold Thigh, i.e., T>Thigh, in block 204 the heating control logic unit 8 deactuates the heating element 5 opening the power regulator 11 or ON/OFF switch. The regulation cycle thus implemented is therefore a temperature control performed on two thresholds Thigh and Tlow.

The temperature control performed on two thresholds Thigh and Tlow can be preferable with respect to the control with a single threshold Tlow since it allows the number of actuations and deactuations of the power regulator 11 to be reduced with a reduction of the switching losses, especially when such a power regulator is a solid state power regulator (e.g., MOSFET). Moreover, this control performed on two thresholds, Thigh and Tlow, allows possible instability of the system to be avoided should the temperature T of the power supply unit 4 quickly change about the temperature Tlow, which would involve continuous switching of the power regulator 11 in case of control carried out on the lower temperature threshold Tlow only according to FIG. 5.

Figure 7:
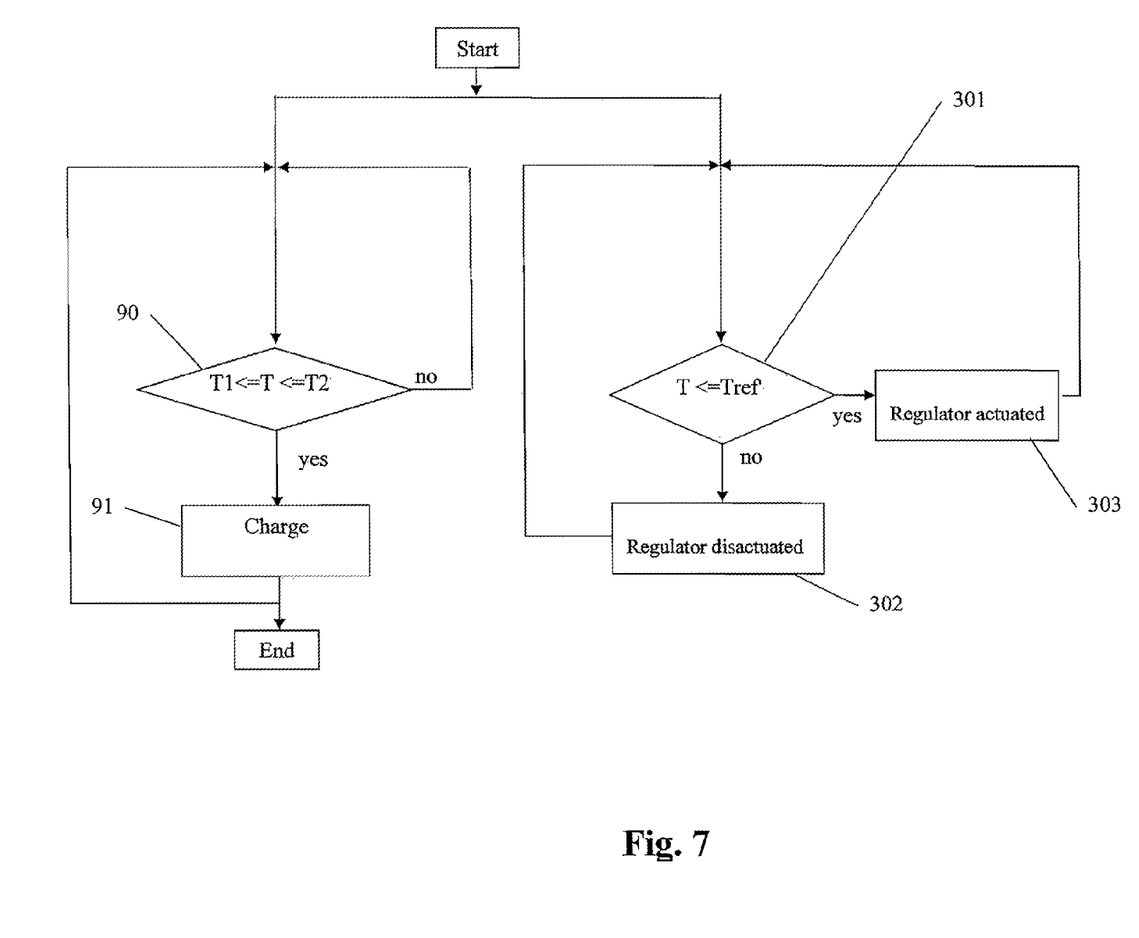
FIG. 7 is a block diagram of a third embodiment of the method of the invention.

In a third embodiment of the method according to the invention the parameters T1 and T2 mentioned above, limits of the charging temperature range, and the lower temperature threshold, indicated here with Tref, are used.

With reference to FIG. 7, concurrently with the charging blocks 90, 91 described above, in block 301 the heating control unit 8 detects the temperature value T of the power supply unit 4 through the temperature sensor 6. If the detected value T is higher than the lower temperature threshold or reference temperature Tref, the heating control unit 8 remains in inactive state, i.e., the heating element 5 is deactuated—block 302. If the detected value T is lower than or equal to the reference temperature Tref, the heating control unit 8 in block 303, through the control output and the regulator 11, actuates the heating element 5 through a signal obtained with a closed loop feedback control system shown schematically in FIG. 8.

Figure 8:
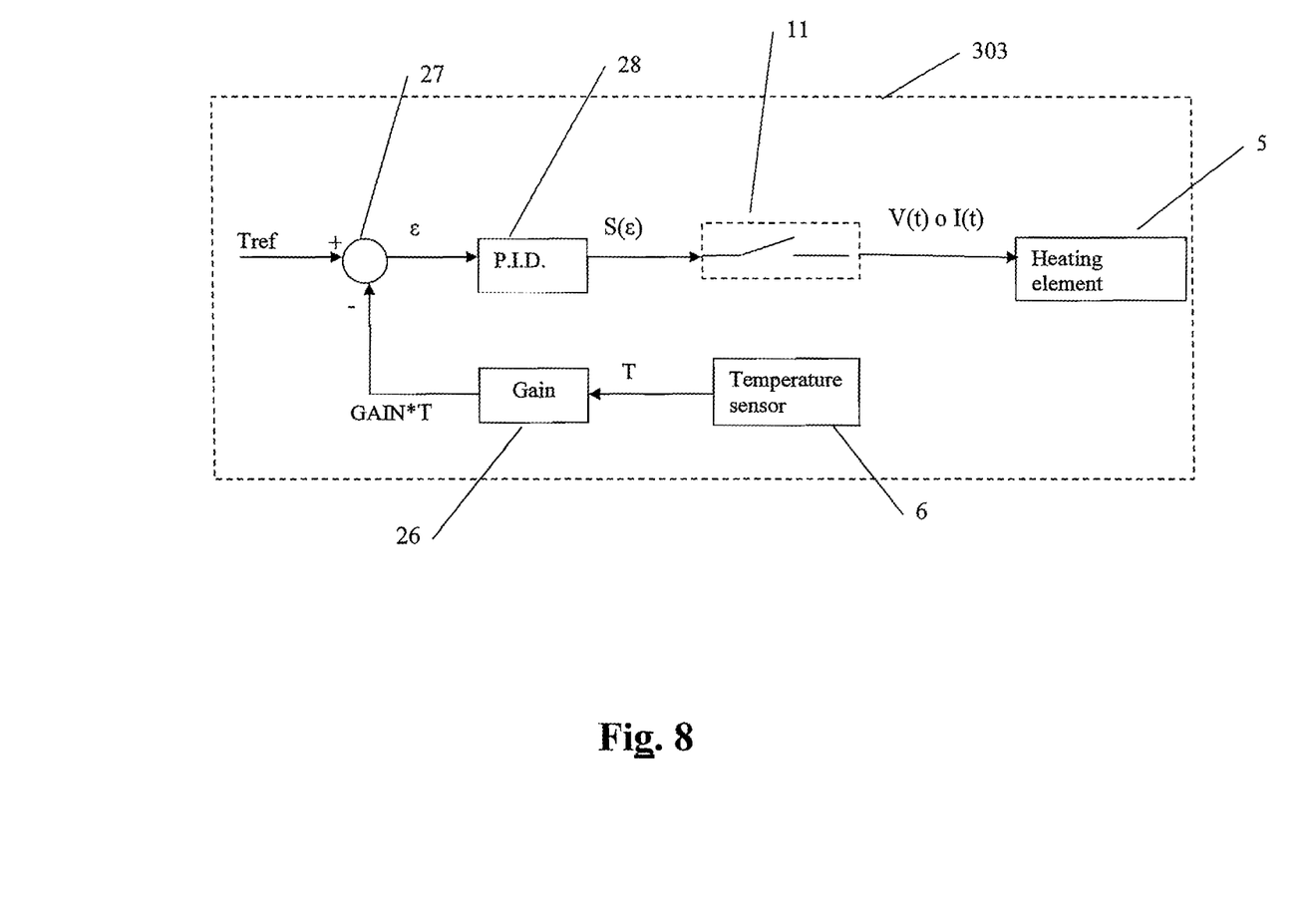
FIG. 8 represents a regulation block of FIG. 7 in greater detail.

The driving signal for the heating element 5 is obtained as processing of an error signal suitably filtered by a P.I.D. regulator block.

More specifically, the temperature value T detected by the temperature sensor 6 of the power supply unit 4 is multiplied in a multiplier 26 by a gain value GAIN, which can also be unitary. The signal at the output of the multiplier, GAIN*T, is subtracted from the value Tref in a subtractor node 27. The output of the subtractor node 27 is indicated as error signal ε=Tref−GAIN*T.

The error signal ε is sent to a P.I.D. type regulator block 28, which has a transfer function of the proportional P, derivative D and/or integrative I type.

The output signal S(ε) of the regulator block 28 is used to drive the power regulator 11 so that the voltage V(t) at the ends of the heating element 5 or the current I(t) that is flowing in the heating element 5 has the desired progression to provide the desired heat power.

Figures 9, 10:
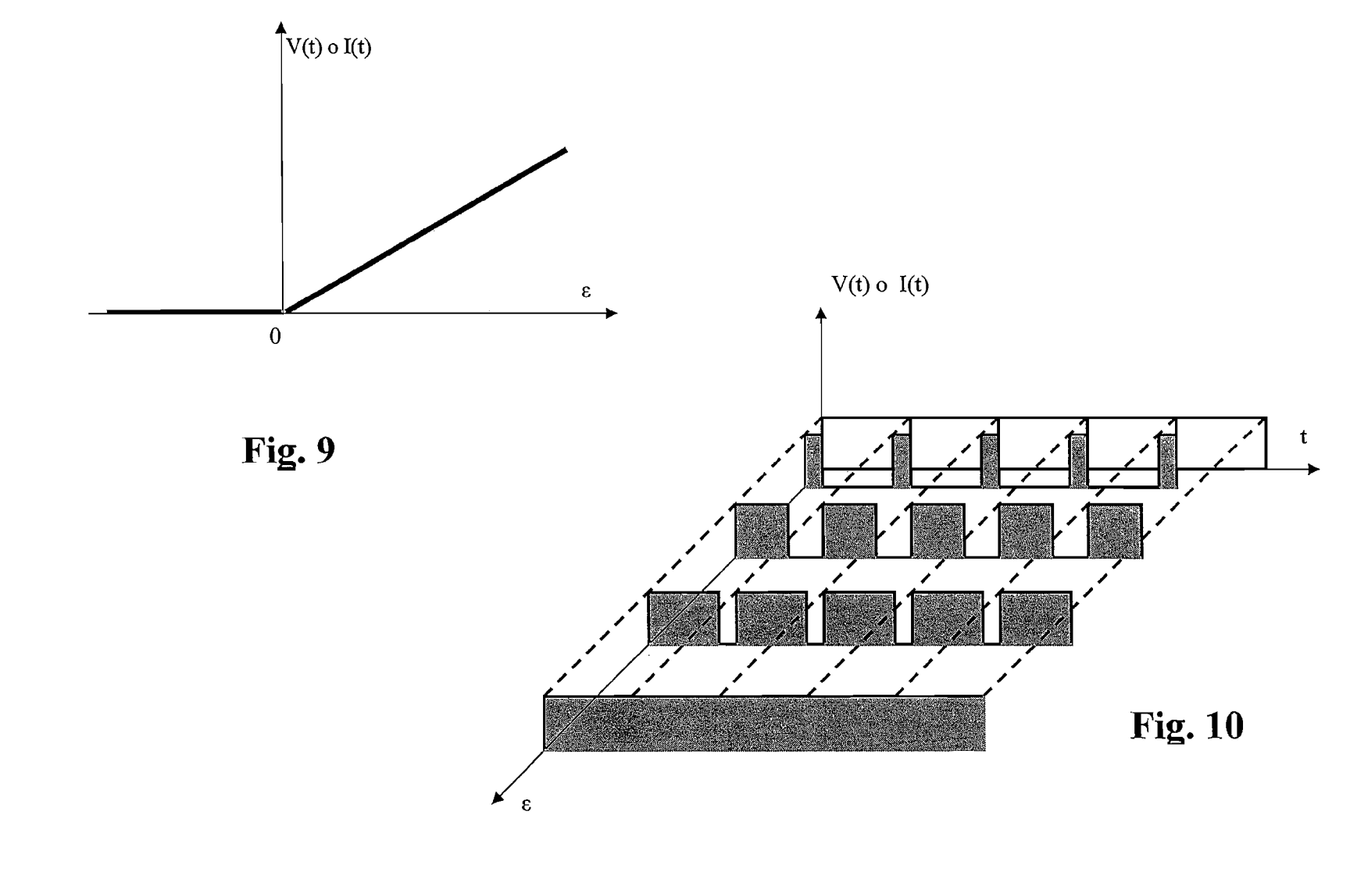
FIGS. 9 and 10 show two preferred embodiments of power supply signals of a heater of the invention.

For example, the drive signal S(ε) can be a signal that causes a voltage value V(t) at the ends of the heating element 5, when of the resistive type, which increases as the error signal ε increases, as illustrated in the diagram of FIG. 9.

As a further example, the drive signal S(ε) can be a signal that causes a voltage value V(t) at the ends of the heating element 5, or a current value I(t) through the heating element 5, when of the resistive type, pulse width modulated (PWM signal), wherein the duty cycle of the modulated signal increases as the error signal ε increases, as illustrated in FIG. 10.

In the various embodiments described above, in case the power supply unit 4 comprises many batteries, a plurality of temperature sensors 6 can be provided for, to detect the respective temperatures. The various embodiments of the method of the invention described above can, in this case, be implemented with respect to the individual temperatures should a plurality of heating elements 5 also be provided, or else with respect to the average temperature or to the minimum temperature among those of the various batteries making up the power supply unit 4.

Those skilled in the art shall understand that several changes, additions, eliminations, and replacements can be made to the embodiments described above without departing from the scope of protection of the invention defined by the attached claims.

What is claimed is:

1. A method for controlling the charging of a rechargeable battery power supply unit for a bicycle electronic device, comprising the steps of:
    providing a rechargeable battery power supply unit having a closed operating temperature range between a low operating temperature and a high operating temperature;
    providing a battery charging unit;
    providing a sensor for detecting at least one temperature of the power supply unit;
    defining a closed charging temperature range having predetermined low temperature and high temperature thresholds;
    providing a power supply unit heating element;
    comparing the detected temperature against the low temperature and high temperature thresholds; and
    activating the power supply unit heating element whenever the detected temperature is lower than or equal to the low temperature threshold.

2. The method according to claim 1, further comprising the steps of providing an external energy source and supplying electrical energy to the power supply unit.

3. The method according to claim 2, wherein the step of supplying electrical energy only occurs when the detected temperature is within the closed charging temperature range.

4. The method according to claim 2 wherein activation of the battery charging unit is prohibited whenever the detected temperature is outside the closed charging temperature range.

5. The method according to claim 1, wherein the low temperature threshold of the closed charging temperature range is higher than the low operating temperature of the closed operating temperature range.

6. The method according to claim 5, wherein the power supply unit heating element is activated until the detected temperature is about 5° C. higher than the low temperature threshold of the closed charging temperature range.

7. The method according to claim 1, wherein the step of activating the power supply unit heating element provides heat as a function of a difference between the low temperature threshold of the closed charging temperature range and the detected temperature.

8. The method according to claim 2, wherein the step of detecting at least one temperature of the power supply unit comprises detecting a first temperature for controlling the execution of the step of supplying electrical energy and a second temperature for controlling the execution of the step of supplying heat energy.

9. The method according to claim 2, wherein the closed charging temperature range is within the closed operating temperature range associated of the power supply unit.

10. A power supply system for a bicycle electronic device, comprising:
    a rechargeable battery power supply unit having a predefined closed charging temperature range with predetermined low temperature and high temperature thresholds;
    at least one sensor of a temperature of the power supply unit;
    at least one selectively activatable heating element, that can be thermally associated with the power supply unit; and
    a heating controller that receives in input an output of the at least one temperature sensor and actuates the heating element whenever a detected temperature is lower than or equal to a lower temperature threshold within a closed charging temperature range characteristic of the power supply unit.

11. The system according to claim 10, further comprising an electrical circuit for receiving energy from an external energy source and for selectively supplying charging energy to the power supply unit.

12. The system according to claim 10, further comprising a power regulator connected between a power supply line of the system and the heating element, and driven by the heating controller to selectively actuate the at least one heating element.

13. The system according to claim 11, further comprising a charge controller that receives in input an output of the at least one temperature sensor and controls the electrical circuit to actuate the supply of electrical charging energy only when the detected temperature is within the closed charging temperature range.

14. The system according to claim 13, wherein the at least one temperature sensor comprises at least one first temperature sensor connected to the charge controller and at least one second temperature sensor connected to the heating controller.

15. The system according to claim 10, further comprising at least one electronic device for controlling an electronic gearshift and/or for acquiring, displaying, and controlling bicycle riding parameters and other functions.

16. Method for controlling the charging of a rechargeable battery power supply unit for a bicycle electronic device, comprising the steps of:
    defining a closed operating temperature range characteristic of the power supply unit between a first predetermined low temperature threshold and a first predetermined high temperature threshold, defining a closed charging temperature range characteristic of the power supply unit between a second predetermined low temperature threshold and a second predetermined high temperature threshold, wherein the first predetermined low temperature threshold is lower than the second predetermined low temperature threshold, wherein the first predetermined high temperature threshold is higher than the second predetermined high temperature threshold, detecting at least one temperature of the power supply unit, and supplying heat energy to the power supply unit whenever the detected temperature is lower than or equal to a lower temperature threshold within said closed charging temperature range characteristic of the power supply unit.

17. Method for controlling the charging of a rechargeable battery power supply unit for a bicycle electronic device, comprising the steps of:

detecting at least one temperature of the power supply unit; and supplying heat energy to the power supply unit when the detected temperature is lower than or equal to a lower temperature threshold within a closed charging temperature range characteristic of the power supply unit wherein the step of supplying heat energy to the power supply unit is carried out until the detected temperature becomes higher than an upper temperature threshold.

18. The method according to claim 17, wherein the upper temperature threshold is lower than an upper limit of the closed charging temperature range.

19. The method according to claim 17, wherein the upper temperature threshold is about 25° C. lower than an upper limit of the closed charging temperature range.

20. The method according to claim 17, wherein the upper temperature threshold is about 15° C. higher than an lower limit of the closed charging temperature range.

21. Power supply system for a bicycle electronic device, comprising:

a rechargeable battery power supply unit;

at least one sensor of a temperature of the power supply unit;

at least one selectively activatable heating element, that can be thermally associated with the power supply unit; and a heating controller that receives in input an output of the at least one temperature sensor and actuates the heating element when the detected temperature is lower than or equal to a lower temperature threshold within a closed charging temperature range characteristic of the power supply unit, wherein said heating controller actuates said heating element until the detected temperature becomes higher than an upper temperature threshold.

22. A power supply system for a bicycle electronic device, comprising:

a rechargeable battery power supply unit;

at least one sensor of a temperature of the power supply unit;

at least one heating element, that is selectively activatable for thermal association with the power supply unit; and a heating controller that receives in input an output of the at least one temperature sensor and actuates the heating element when the detected temperature is lower than or equal to a lower temperature threshold within a closed charging temperature range characteristic of the power supply unit, wherein the lower temperature threshold is higher than a lower limit of the closed charging temperature range.

23. The system according to claim 22, wherein the lower temperature threshold is higher by about 5° C. than a lower limit of the closed charging temperature range.

* * * * *